United States Patent
Fang et al.

(10) Patent No.: US 11,542,430 B2
(45) Date of Patent: Jan. 3, 2023

(54) METHOD FOR PREPARING FLUORESCENT-ENCODED MICROSPHERES COATED WITH METAL NANOSHELLS

(71) Applicant: Hangzhou ShineDo Biotech Co., LTD., Hangzhou (CN)

(72) Inventors: Jianqiu Fang, Anji Huzhou (CN); Chunmei Zhong, Hangzhou (CN); Wanwan Li, Hangzhou (CN)

(73) Assignee: HANGZHOU SHINEDO BIOTECH CO., LTD., Hangzhou (CN)

( * ) Notice: Subject to any disclaimer, the term of this patent is extended or adjusted under 35 U.S.C. 154(b) by 238 days.

(21) Appl. No.: 16/834,703

(22) Filed: Mar. 30, 2020

(65) Prior Publication Data
US 2021/0269707 A1  Sep. 2, 2021

(30) Foreign Application Priority Data
Mar. 2, 2020 (CN) .................. 202010135367.X

(51) Int. Cl.
*C09K 11/02* (2006.01)
*B01F 23/43* (2022.01)
(Continued)

(52) U.S. Cl.
CPC ........ *C09K 11/025* (2013.01); *B01F 23/4105* (2022.01); *B01F 23/43* (2022.01);
(Continued)

(58) Field of Classification Search
CPC ....... C09K 11/025; B82Y 20/00; B82Y 40/00; B01J 13/02; B01J 13/04; B01F 23/06; B01F 4/46; B01F 4/807
See application file for complete search history.

(56) References Cited

FOREIGN PATENT DOCUMENTS

| CN | 108587609 | * | 9/2018 |
| CN | 108587610 A | | 9/2018 |

(Continued)

OTHER PUBLICATIONS

Translation for CN 110542685, Nov. 15, 2019.*
(Continued)

*Primary Examiner* — C Melissa Koslow
(74) *Attorney, Agent, or Firm* — NZ Carr Law Office

(57) ABSTRACT

A method for preparing fluorescent-encoded microspheres coated with metal nanoshells is disclosed herein. By using SPG method, metal nano-material modified with a certain ligand is used as a new surfactant in the emulsification process, and different kinds and different amounts of fluorescent materials are doped into polymer microspheres to prepare fluorescent-encoded microspheres with different fluorescent-encoded signals and uniformly coated metal nanoshells in one step. The prepared fluorescent-encoded microsphere comprises a metal nanoshell, a polymer, and a fluorescent-encoded material. The fluorescent-encoded microsphere has a particle size of 1 μm~20 μm, CV of less than 10%, which can be used for protein/nucleic acid detection. The preparation method has the advantages of simple process, high surface coating rate, good uniformity and controllable LSPR peaks, which can solve the problems of existing commonly used metal nanoshell coating methods such as low surface coating rate, poor uniformity, complex preparation process and uncontrollable local surface plasmon resonance (LSPR) peaks, etc.

17 Claims, 4 Drawing Sheets

(51) Int. Cl.
  *B01F 23/40* (2022.01)
  *B01F 23/41* (2022.01)
  *B01F 33/45* (2022.01)
  *B01J 13/04* (2006.01)
  *B01J 13/02* (2006.01)
  *B82Y 15/00* (2011.01)
  *B82Y 20/00* (2011.01)
  *B82Y 30/00* (2011.01)
  *B82Y 40/00* (2011.01)
  *G01N 21/25* (2006.01)
  *B01F 23/00* (2022.01)

(52) U.S. Cl.
  CPC .............. *B01F 23/49* (2022.01); *B01F 33/45* (2022.01); *B01J 13/02* (2013.01); *B01J 13/04* (2013.01); *B01F 23/06* (2022.01); *B01F 23/4146* (2022.01); *B01F 23/48* (2022.01); *B82Y 15/00* (2013.01); *B82Y 20/00* (2013.01); *B82Y 30/00* (2013.01); *B82Y 40/00* (2013.01); *G01N 21/25* (2013.01); *G01N 2021/258* (2013.01)

(56) References Cited

FOREIGN PATENT DOCUMENTS

| | | | |
|---|---|---|---|
| CN | 110452685 | * | 11/2019 |
| CN | 110452685 A | | 11/2019 |
| CN | 110567928 A | | 12/2019 |
| WO | 2014040353 A1 | | 3/2014 |
| WO | 2014124543 A1 | | 8/2014 |
| WO | WO 2014/124543 | * | 8/2014 |

OTHER PUBLICATIONS

Translation for CN 108587609, Sep. 28, 2018.*
EESR of the corresponding EP Patent Application No. 20166450.5 dated Jul. 22, 2020.

* cited by examiner

METHOD FOR PREPARING FLUORESCENT-ENCODED MICROSPHERES COATED WITH METAL NANOSHELLS

CROSS REFERENCE TO RELATED APPLICATION

The present application claims the priority from China Patent Application No. 202010135367.X, filed on Mar. 2, 2020. The entirety of this application including all tables, diagrams and claims are incorporated hereby as reference.

FIELD OF THE INVENTION

The present invention relates to preparation and application of micro-nano materials, in particular to fluorescent-encoded microspheres coated with metal nanoshells, a preparation method and applications thereof.

BACKGROUND OF THE INVENTION

Liquid-phase biochip technique uses encoded microspheres as a carrier for liquid-phase reactions and adopts fast and high-throughput flow cytometry as the analysis method based on the rules of protein-protein, nucleic acid-nucleic acid interactions, to perform fast and high-throughput multiplex quantitative detection of proteins and nucleic acids, with a wide range of applications in the protein expression, nucleic acid analysis, early diagnosis of disease and prognosis, etc. Compared with traditional detection methods, liquid-phase chip technique has reached higher detection sensitivity, however, with the rapid development of nanoscience and nanotechnology, especially for the increasing demand for precise diagnosis, its performance needs to be improved. The technical core of the liquid phase biochip is a polymer microsphere with a coded signal. Currently, the commonly used coded signals include spectral signal coding, graphic (image) coding, chemical signal coding, physical signal coding, etc. Among them, the spectral signal coding is most widely used due to its flexible coding, fast and convenient decoding.

A large number of studies have found that the localized surface plasmon resonance (LSPR) effect produced by precious metal nano-material under the condition of light incidence can be used to effectively enhance the intensity of the fluorescent signals of the fluorescent molecules/particles connected to the surface, and thus enhance the detection sensitivity. In addition, studies have shown that the enhancement effect is more obvious when the absorption peak/emission peak of fluorescent molecules/particles overlaps with the plasmon resonance peak on the surface of precious metals. If fluorescent-encoded microspheres can be successfully controlled to coat precious metal nanoshells with strong LSPR effect, it is expected to effectively enhance the fluorescence intensity of fluorescent reporter molecules, increase their optical stability and improve the detection sensitivity.

At present, the methods of coating precious metal nanoshells on the surface of polymer microspheres mainly include seed growth method, layer-by-layer self-assembly method, in-situ chemical reduction method, solvent swelling co-deposition method, and pickering emulsion polymerization method, etc. However, these preparation methods generally have the problems such as low surface coverage, poor uniformity, complex preparation processes and uncontrollable LSPR peaks, etc.

SUMMARY OF THE INVENTION

Therefore, technicians skilled in the art are committed to developing a method of coating metal nanoshells on the surface of polymer microspheres with simple preparation process, good uniformity (CV<10% supported by relevant data) and controllable LSPR peak (400-900 nm supported by relevant data), to obtain a liquid biochip detection technique with high stability, high reproducibility and high sensitivity and provide a powerful tool for diagnosis of diseases.

To achieve the foregoing object, in one aspect, the present invention provides a method for preparing fluorescent-encoded microspheres coated with metal nanoshells (SPG method), mainly comprising the following steps:

Step I: dispersing a metal nano-material resuspended in a solvent in ultrapure water to form a continuous phase;

Step II: dissolving the fluorescent material and polymer in a certain amount of organic solvent to form a dispersed phase;

Step III: squeezing the dispersed phase to pass through a SPG membrane using a membrane emulsification device under pressure, and forming oil-in-water droplets on the surface of the SPG membrane under the action of continuous phase.

Further, the pressure in step III is preferably gas pressure.

Further, the oil-in-water droplets in step III are removed from the surface of the SPG membrane by the shearing force of the continuous phase to form a uniform oil-in-water emulsion.

Further, the obtained uniform oil-in-water emulsion is magnetically stirred at room temperature to volatilize the organic solvent in the emulsion, and precious metal nano-material is uniformly coated on the surface of the polymer microsphere to prepare fluorescent-encoded microspheres coated with metal nanoshells.

Further, the metal nano-material is a precious metal nano-material.

Further, the precious metal nano-material comprises one of gold nano-particle, gold nanorod, gold nano-bipyramid, silver nanosphere, silver nano-cube, gold@silver core-shell nano-particle, silver@gold core-shell nano-particle, gold/silver alloy nano-particle.

Further, the solvent in step one is ethanol.

Further, the polymer includes styrene-maleic anhydride copolymer, styrene-acrylic acid copolymer, polystyrene, and so on:

Further, the fluorescent-encoded material comprises one or more of quantum dot luminescent materials, such as CdSe/ZnS, CdSe/CdS, CdTeSe/ZnS, CdTe/CdSe/ZnS, CdTe, $Ag_2S$, $Ag_2Se$, InAs, InP, HgTe, PbS, PbSe, $CuInS_2$, $CuInSe_2$, CdSeTe, CdHgTe, InP/ZnS, InAs/CdSe, CdTe/CdS, CdTe/ZnS, CdTe/CdSe, ZnTe/CdTe, ZnTe/CdSe, ZnTe/CdS, CdSeTe/CdS, Cu:CdS/ZnS, Mn: ZnSe/ZnS, $CuInS_2$/ZnS, $CuInSe_2$/ZnS, $CsPbCl_3$, $CsPbBr_3$, $CsPbI_3$, $CsPb (Cl/Br)_3$, $CsPb (Br/I)_3$, $CH_3NH_3PbI_3$, $CH_3NH_3PbBr_3$) and aggregation-induced emission (AIE) materials (1,1,2,3,4,5-hexaphenylsilole (HPS), tetraphenylethylene (TPE), 9,10-diphenylvinylanthracene (DSA), triphenylamine, tetraphenylethylene-perylene diimide, triphenylamine-fumaronitrile compound (BDABFN), tetraphenylethylene-triphenylamine derivative (TPE-TPA-DCM), tetraphenylethylene-sulfonate derivative (BSPOTPE), or cyano-substituted diarylethylene derivative, and boron-based and silicon-based AIE molecules and derivatives thereof).

Further, the concentration of the metal nano-material is larger than 0 and smaller than or equal to 0.3 g/mL in the aqueous phase.

Further, the concentration of the fluorescent-encoded material is larger than 0 and smaller than or equal to 50 mg/mL in the oil phase.

Further, the concentration of the polymer is larger than 0 and smaller than or equal to 2 g/mL in the oil phase.

Further, the organic solvent of step II is one of toluene, chloroform, dichloromethane.

In another aspect, the present invention provides a fluorescent-encoded microsphere coated with metal nanoshells obtained by the foregoing method for preparing fluorescent-encoded microspheres coated with metal nanoshells (SPG-Pickering emulsion method), wherein the fluorescent-encoded microspheres comprise precious metal nanoshells, polymers, fluorescent-encoded materials, and the fluorescent-encoded microspheres have a particle size of 1 μm to 20 μm, with a coefficient of variation (CV) of less than 10%.

In still another aspect, the present invention further provides applications of the fluorescent-encoded microspheres coated with metal nanoshells as described above, which can be used for the detection of one or more proteins or nucleic acids.

The prevent invention provides a fluorescent-encoded microsphere coated with metal nanoshells, a preparation method and applications thereof. By using the SPG-Pickering emulsion method, metal nano-material modified with a certain ligand is used as a new surfactant in the emulsification process, and different kinds and different amounts of fluorescent materials are doped into polymer microspheres to prepare fluorescent-encoded microspheres with different fluorescent-encoded signals and uniformly coated metal nanoshells in one step.

The preparation method has the advantages of simple process, high surface coating rate, good uniformity and controllable LSPR peaks, which can solve the problems of existing commonly used metal nanoshell coating methods such as low surface coating rate, poor uniformity, complex preparation process and uncontrollable LSPR peaks, etc. Using this kind of fluorescent-encoded microspheres coated with metal nanoshells on the surface as a carrier, it can achieve fast and high-throughput multiple quantitative detection of proteins and nucleic acids, etc., which can dramatically improve the stability of encoded microspheres, increase the detection sensitivity. Therefore, it has very important significance and extensive application prospects in the liquid phase biochip detection technologies.

DETAILED DESCRIPTION OF THE EMBODIMENTS

Figure 1:
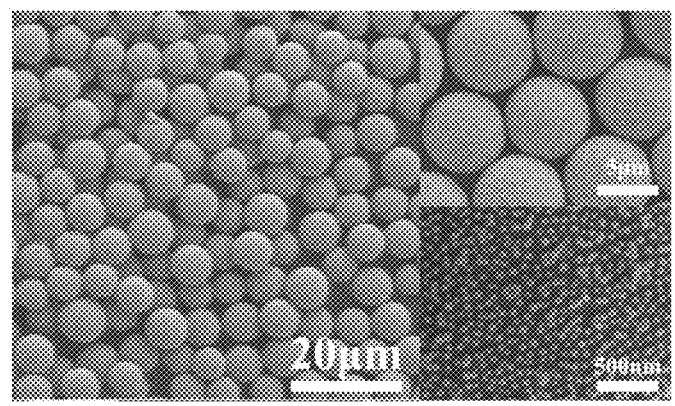
FIG. 1 is a SEM image of fluorescent-encoded microspheres coated with metal nanoshells obtained in a preferred embodiment of the present invention (Example 1).
Figure 2:
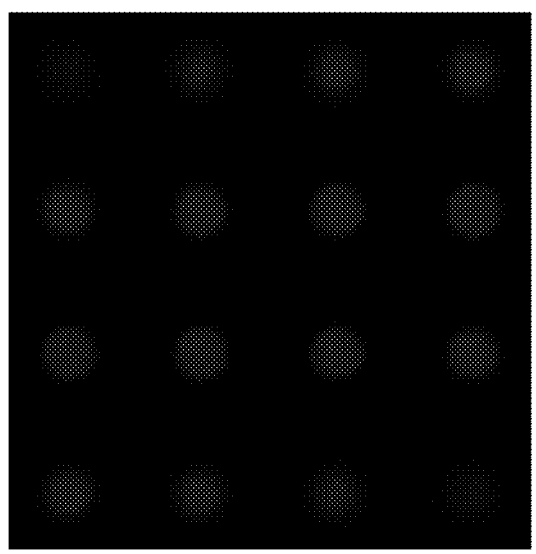
FIG. 2 is a laser confocal image of fluorescent-encoded microspheres coated with metal nanoshells obtained in a preferred embodiment of the present invention (Example 2).
Figure 3:
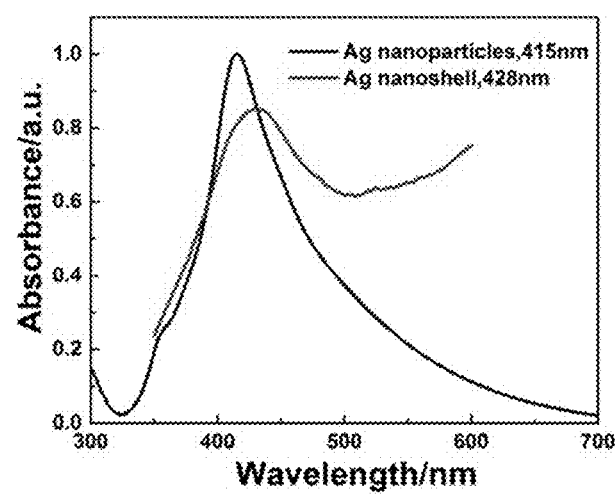
FIG. 3 is an absorption spectrum of fluorescent-encoded microspheres coated with metal nanoshells obtained in a preferred embodiment of the present invention (Example 3).

The structures involved in this invention or the used technical terms are further described below. These descriptions are only to explain how to achieve the ways in this invention through examples, and will not restrict this invention. The scope of the invention is defined and expressed by the claims.

Detection

Detection means to assay or test the presence or absence of a substance or material, including but not limited to chemical substances, organic compounds, inorganic compounds, metabolic products, medicines or drug metabolites, organic tissues or metabolites of organic tissues, nucleic acids, proteins or polymers. Additionally, detection means to test the quantity or presence of a substance or a material. Furthermore, assay also means immunodetection, chemical detection, enzyme detection, nucleic acid detection, and etc.

Metal Suspension as a Continuous Phase

Continuous phase refers to a substance that disperses other substances in the dispersion system. The present invention may include a solution of metal particles as a continuous phase. Metal micro particle, for example, nanoparticles, can exist as a suspension. Generally, the solvent used to prepare the suspension solution is a polar solvent, such as ethanol or water, or a solvent that is soluble in water. The metal herein refers to a substance that has luster (i.e. strong reflection to visible lights), is malleable and is easily conductive and thermally conductive. Metals can be divided into ferrous metals, non-ferrous metals, common metals, rare metals, light metals, heavy metals, precious metals, metalloid elements, rare refractory metals, rare scattered metals, rare earth metals, radioactive metals and synthetic metals.

Ferrous metals: iron, chromium, manganese, and alloys of the three metals, especially ferrous alloy steel and iron.

Non-ferrous metals: aluminum, magnesium, potassium, sodium, calcium, strontium, barium, copper, lead, zinc, tin, cobalt, nickel, antimony, mercury, cadmium, bismuth, gold, silver, platinum, ruthenium, rhodium, palladium, thorium, iridium, beryllium, lithium, rubidium, cesium, titanium, zirconium, hafnium, vanadium, niobium, tantalum, tungsten, molybdenum, gallium, indium, thallium, germanium, rhenium, lanthanum, cerium, praseodymium, neodymium, samarium, europium, gadolinium, terbium, dysprosium, holmium, erbium, thulium, ytterbium, lutetium, scandium, yttrium, silicon, boron, selenium, tellurium, arsenic, thorium.

Common metals: such as iron, aluminum, copper, zinc, tin, mercury, titanium, tungsten, lead, nickel, steel with abnormal structure, wear resistant steel, acid converter steel, acid high-frequency induction furnace steel, acid open hearth steel, etc.

Rare metals: such as zirconium, hafnium, niobium, tantalum, lithium, beryllium, titanium, vanadium, germanium, niobium, molybdenum, cesium, lanthanum, tungsten, radium, rubidium, platinum, iridium, osmium, gallium, cerium, neodymium, polonium, radium, actinium, uranium, plutonium, lithium, indium, thallium, rhenium, selenium, tellurium, scandium, yttrium, francium, thorium, protactinium, uranium, technetium, promethium, etc.

Light metals: Metals with a density less than 4500 kg/m3, such as titanium, aluminum, magnesium, potassium, sodium, calcium, strontium, barium, etc.

Heavy metals: Metals with a density greater than 4500 kg/m3, such as copper, nickel, cobalt, lead, zinc, tin, antimony, bismuth, cadmium, mercury, etc.

Precious metals: such as gold, silver, platinum group metals (ruthenium, rhodium, palladium, osmium, iridium, platinum), etc.

Metalloid elements: having properties between metals and non-metals, such as silicon, selenium, tellurium, arsenic, boron, polonium, germanium and antimony, etc.

Radioactive metals: such as radium, francium, polonium, actinium, uranium, thorium, protactinium, uranium, technetium, promethium, neptunium, plutonium, americium, curium, berkelium, californium, einsteinium, fermium, mendelevium, nobelium, lawrencium, and elements after actinium series. At present, elements 104 to 109 have been synthesized.

Synthetic metals: A class of compounds that do not contain elemental metals but have metal conductivity, such as polyacetylene, perovskite-type oxides, tungsten bronze, transition metals-rare-earth perovskite-type oxides, LaNiO3, etc.

Alloy: A substance composed of two or more chemical elements, and at least one of which is a metal element and has metallic properties. An alloy composed of two elements is collectively referred to as a "binary alloy", and an alloy composed of three or more elements is commonly referred to as a "multielement alloy", such as nickel-chromium alloy, aluminum alloy, beryllium bronze and so on.

In some embodiments, the metal is precious metal. Precious metal mainly refers to eight metal elements such as gold, silver and platinum group metals (ruthenium, rhodium, palladium, osmium, iridium, platinum), etc. Most of these metals have beautiful colors and luster, are more expensive than common metals, have low crust abundance. They are difficult to purify and have strong chemical stability, and under normal conditions, these metals are not easy to chemically react with other chemicals. The precious metals herein can be used to make continuous phase.

Nanometer

Metals herein generally exist in the form of particles with different particle sizes. It can be a nanoparticle or a non-nanoparticle. In some preferred embodiments, metals may be nanoparticles. Nanoparticles, also known as ultrafine powder or micropowder, generally refer to powder or particles with a particle size of less than 100 nanometers. It is a kind of solid particulate material in an intermediate state between atoms, molecules and macroscopic objects.

Precious metal nano-material: Nano-scale precious metal materials that have undergone significant changes in their optical, thermal, electrical, magnetic, mechanical, and chemical properties and have many novel properties, mainly reflected in surface and interfacial effects, volume effect, quantum size effect and macro quantum-tunnel effect. These materials mainly include gold nanoparticle, gold nanorod, gold nanobipyramid, gold nanocluster, gold nanofiber, gold nanosphere, gold nanocube, gold nanoceramic, gold nanopowder, gold nanomembrane, gold nanowire, gold nanosheet, silver nanoparticle, silver nanorod, silver nanobipyramid, silver nanocluster, silver nanofiber, silver nanosphere, silver nanocube, silver nanoceramic, silver nanopowder, silver nanomembrane, silver nanowire, silver nanosheet, platinum nanoparticle, platinum nanorod, platinum nanobipyramid, platinum nanocluster, platinum nanofiber, platinum nanosphere, platinum nanocube, platinum nanoceramic, platinum nanopowder, platinum nanomembrane, platinum nanowire, platinum nanosheet, ruthenium nanoparticle, ruthenium nanorod, ruthenium nanobipyramid, ruthenium nanocluster, ruthenium nanofiber, ruthenium nanosphere, ruthenium nanocube, ruthenium nanoceramic, ruthenium nanopowder, ruthenium nanomembrane, ruthenium nanowire, platinum nanosheet, rhodium nanoparticle, rhodium nanorod, rhodium nanobipyramid, rhodium nanocluster, rhodium nanofiber, rhodium nanosphere, rhodium nanocube, rhodium nanoceramic, rhodium nanopowder, rhodium nanomembrane, rhodium nanowire, rhodium nanosheet, palladium nanoparticle, palladium nanorod, palladium nanobipyramid, palladium nanocluster, palladium nanofiber, palladium nanosphere, palladium nanocube, palladium nanoceramic, palladium nanopowder, palladium nanomembrane, palladium nanowire, palladium nanosheet, osmium nanoparticle, osmium nanorod, osmium nanobipyramid, osmium nanocluster, osmium nanofiber, osmium nanosphere, osmium nanocube, osmium nanoceramic, osmium nanopowder, osmium nanomembrane, osmium nanowire, osmium nanosheet, iridium nanoparticle, iridium nanorod, iridium nanobipyramid, iridium nanocluster, iridium nanofiber, iridium nanosphere, iridium nanocube, iridium nanoceramic, iridium nanopowder, iridium nanomembrane, iridium nanowire, iridium nanosheet, gold@silver core-shell nanoparticle, gold@platinum core-shell nanoparticle, gold@ruthenium core-shell nanoparticle, gold@rhodium core-shell nanoparticle, gold@palladium core-shell nanoparticle, gold@osmium core-shell nanoparticle, gold@iridium core-shell nanoparticle, silver@gold core-shell nanoparticle, silver@platinum core-shell nanoparticle, silver@ruthenium core-shell nanoparticle, silver@rhodium core-shell nanoparticle, silver@palladium core-shell nanoparticle, silver@osmium core-shell nanoparticle, silver@iridium core-shell nanoparticle, gold/silver alloy nanoparticle, gold/platinum alloy nanoparticle, gold/ruthenium alloy nanoparticle, gold/rhodium alloy nanoparticle, gold/palladium alloy nanoparticle, gold/osmium alloy nanoparticle, gold/iridium alloy nanoparticle, silver/platinum alloy nanoparticle, silver/ruthenium alloy nanoparticle, silver/rhodium alloy nanoparticle, silver/palladium alloy nanoparticle, silver/osmium alloy nanoparticle, silver/iridium alloy nanoparticle and so on.

In some embodiments, the precious metal nano-material herein may be one of gold nanoparticle, gold nanorod, gold nanobipyramid, silver nanosphere, silver nanocube, gold@silver core-shell nanoparticle, silver@gold core-shell nanoparticle, gold/silver alloy nanoparticle.

A solvent is a liquid that does not undergo any change in chemical composition and can dissolve other substances (generally solids), or a liquid that chemically reacts with and dissolves solids. The resulting homogeneous mixture system is called a solution. The excessive amount of component in the solution is called the solvent, and the small amount of component is called the solute. A solvent is a medium that can dissolve the solute. Solvents other than water are called non-aqueous or organic solvents, while water, liquid ammonia, liquid metals, inorganic gases, etc. are called inorganic solvents. Solvents are divided into organic solvents and inorganic solvents according to their chemical compositions. Usually solvents have a relatively low boiling point and are easily volatile, or may be removed by distillation to leave the dissolved substance. The solvent can be used to extract soluble compounds from the mixture. Solvents are usually transparent, colorless liquids, and most of them have a unique odor.

The solvent used to resuspend the metal nanoparticles is amphiprotic solvent. The "amphiprotic solvent" herein refers to a solvent that has comparable ability to give protons and accept protons, for example, water, methanol, and ethanol. In some preferred embodiments, it is ethanol, for example, 20-90% ethanol solution. Before preparing a continuous phase, the metal nanoshell can be resuspended in ethanol, and during preparation, the metal nano-material resuspended in ethanol can be dispersed in ultrapure water to form a continuous phase.

Dispersed Phase

In the present invention, a polymer and a fluorescent-encoded material are used as the solute, and an inert organic solvent is used as the solvent, to form a dispersed phase. The polymer here may be any polymer, and the polymer and the fluorescent-encoded material together form the solute in the dispersed phase. The inert organic solvent is the solvent that can neither provide nor accept protons.

Polymer

The polymer is a product obtained by the polymerization (addition polymerization) of a monomer. Molecules have repetitive structural units. Polymers with low molecular weight are called oligomers, and those with high molecular weight (thousands or millions of Da) are called superpolymer or macromolecular compound.

Polymers mainly include trioxymethylene, organic silicone oligomer, siloxane oligomer, polyethylene wax oligomer, polyethylene, polypropylene, polyacrylamide, polyvinyl chloride, polystyrene, resin, polyester, rubber, styrene-maleic anhydride copolymer, styrene-acrylic acid copolymer, polyacrylic acid, polymethyl methacrylate, polyethyl acetate, polystyrene methacrylic acid copolymer, maleic anhydride-1-octadecene copolymer, polydimethylsiloxane, polyethoxylated trimethylolpropane triacrylate, polyhydroxyethyl methacrylate, polyethylene glycol diacrylate, polyethylene glycol, poly (N-isopropylacrylamide), protein, starch, polylactic acid, cellulose, polyethylene [—CH2—CH2—] n, Nylon 6 [—NH(CH2)5CO—] n, phenolic resin, urea resin, vulcanized rubber, phenolic resin, amine-aldehyde resin, epoxy resin, polyester resin, chemical fiber, polyamide, polyether, olefin polymer, cellulose acetate, acrylate, polycarbonate, polyetheretherketone, polysulfone, polyphenylene sulfide, terephthalate, fluorine rubber, nitrile rubber, etc.

In some embodiments of the present invention, the polymer forming the dispersed phase with the fluorescent-encoded material may be styrene-maleic anhydride copolymer, polyacrylamide, maleic anhydride-1-octadecene copolymer, etc.

Fluorescent-Encoded Materials

Fluorescent-encoded materials mainly include quantum dot fluorescent material and aggregation-induced emission material.

Quantum dots are semiconductor nanostructures that bind excitons in three spatial directions, sometimes called "artificial atoms", "superlattices", "superatoms" or "quantum dot atoms". It is a new concept proposed in the 1990s. A quantum dot is a semiconductor nanocrystal with a radius smaller than or close to exciton bohr radius. Due to its unique fluorescent nano-effect, its excitation spectrum is wide and continuously distributed, and its emission spectrum is narrow and symmetrical. The emission wavelength can be adjusted by changing the particle size and composition, with strong fluorescence intensity, slow bleaching rate and high sensitivity; therefore, it is widely used in the fields of photocatalysis, photosensitive sensors, luminescent materials, fluorescent probe labeling, etc. Especially, the quantum dots (such as CdSe) composed of Group IIB and VIA elements have very special and excellent fluorescence emission properties in the visible and near-infrared spectral regions, therefore, they have important value in biomedical fluorescent probe labels and sensors. Quantum dots have a separate quantized energy spectrum. The corresponding wave function is located in the quantum dot in space, but extends over several lattice periods. A quantum dot has a small number (1-100) of integer number of electrons, electron holes or electron-electron hole pairs, that is, the electric quantity it carries is an integer multiple of the elementary charge. Quantum dots mainly include CdSe/ZnS, CdSe/CdS, CdTeSe/ZnS, CdTe/CdSe/ZnS, CdTe, Ag2S, Ag2Se, InAs, InP, HgTe, PbS, PbSe, CuInS2, CuInSe2, CdSeTe, CdHgTe, InP/ZnS, InAs/CdSe, CdTe/CdS, CdTe/ZnS, CdTe/CdSe, ZnTe/CdTe, ZnTe/CdSe, ZnTe/CdS, CdSeTe/CdS, Cu:CdS/ZnS, Mn: ZnSe/ZnS, CuInS2/ZnS, CuInSe2/ZnS, CsPbCl3, CsPbBr3, CsPbI3, CsPb (Cl/Br)3, CsPb (Br/I)3, CH3NH3PbI3, CH3NH3PbBr3, CdSe, CdS, ZnSe, ZnTe, ZnO, HgSe, HgS, CaAs, InCaAs, CdSe/ZnSe, CdS/ZnS, CdS/Ag2S, CdS/Cd (OH)2, CdSe/ZnSe, CdS/HgS, CdS/HgS/CdS, ZnS/CdS, ZnS/CdS/ZnS, ZnS/HgS/ZnS/CdS, CdSe/CuSe, CdSeTe/CdS/ZnS, CdSe/CdS/ZnS, CdS:Mn, ZnS:Mn, CdS:Cu, ZnS:Cu, CdS:Tb, ZnS:Tb, etc.

Aggregation-induced emission materials mainly include cyclic polyene compounds, (for example, Silole derivatives, tetrathienylthiophene), cyano-substituted stilbene-based compounds, tetraphenylethylene-based compounds, divinylanthracene-based compounds, triphenylethylene-based compounds and dicarbazole triphenylethylene, 1,1,2,3,4,5-hexaphenylsilole (HIPS), tetraphenylethylene (TPE), 9,10-diphenylvinylanthracene (DSA), triphenylamine, tetraphenylethylene-perylene diimide, triphenylamine-fumaronitrile compound (BDABFN), tetraphenylethylene-triphenylamine derivative (TPE-TPA-DCM), tetraphenylethylene-sulfonate derivative (BSPOTPE), cyano-substituted diarylethylene derivative and boron-based and silicon-based AIE molecules and derivatives thereof, triphenylethylene derivatives, tetra-(4-methylbiphenyl) ethylene, etc.

In some embodiments of the present invention, the fluorescent-encoded materials forming a dispersed phase with polymers can be quantum dots (CdSe/ZnS, CdSe/CdS, CdTeSe/ZnS, CdTe/CdSe/ZnS, CdTe, Ag2S, Ag2Se, InAs, InP, HgTe, PbS, PbSe, CuInS2, CuInSe2, CdSeTe, CdHgTe, InP/ZnS, InAs/CdSe, CdTe/CdS, CdTe/ZnS, CdTe/CdSe, ZnTe/CdTe, ZnTe/CdSe, ZnTe/CdS, CdSeTe/CdS, Cu:CdS/ZnS, Mn: ZnSe/ZnS, CuInS2/ZnS, CuInSe2/ZnS, CsPbCl3, CsPbBr3, CsPbI3, CsPb (Cl/Br)3, CsPb (Br/I)3, CH3NH3PbI3, CH3NH3PbBr3), aggregation-induced emission material (1,1,2,3,4,5-hexaphenylsilole (HPS), tetraphenylethylene (TPE), 9, 10-diphenylvinylanthracene (DSA), triphenylamine, tetraphenylethylene-perylene diimide, triphenylamine-fumaronitrile compound (BDABFN), tetraphenylethylene-triphenylamine derivative (TPE-TPA-DCM), tetraphenylethylene-sulfonate derivative (BSPOTPE), cyano-substituted diarylethylene derivative and boron-based and silicon-based AIE molecules and derivatives thereof), etc.

Organic Solvents

Organic solvents are organic compounds containing carbon atoms. They are a large class of organic compounds widely used in daily life and production. They have a small molecular weight and are liquid at room temperature. Organic solvents include multiple types of substances such as alkanes, olefins, alcohols, aldehydes, amines, esters, ethers, ketones, aromatic hydrocarbons, hydrogenated hydrocarbons, terpene hydrocarbons, halogenated hydrocarbons, heterocyclic compounds, nitrogen-containing compounds and sulfur-containing compounds, etc. Most of them are toxic to human body. They are found in coatings, adhesives, lacquers and cleansers. The organic solvents such as styrene, perchloroethylene, trichloroethylene, ethylene glycol ether and triethanolamine are often used.

Organic solvents are a class of organic compounds that can dissolve some water-insoluble substances (such as oils and fats, waxes, resins, rubbers, dyes, etc.). They are usually liquid at normal temperatures and pressures and have high volatility. The properties of solutes and solvents remain unchanged during the dissolution process. Solvents must not react chemically with solutes and they must be inert.

Inert organic solvent mainly includes benzene, benzene, toluene, xylene, o-xylene, m-xylene, p-xylene, hexamethylbenzene, ethylbenzene, n-propylbenzene, cumene, biphenyl, diphenylmethane, triphenylmethane, styrene, phenylacetylene, naphthalene, tetralin, anthracene, phenanthrene, pyrene, chloroform, N-methylpyrrolidone, diphenyl ether, acetone, methyl butanone, methyl isobutyl ketone, cyclohexanone, isophoron, diacetone alcohol, silicone, tetraethylene glycol dimethyl ether, ethylene glycol monomethyl ether, ethylene glycol monoethyl ether, ethylene glycol monobutyl ether, nitrobenzene, carbon tetrachloride, dichloroethane, chlorobenzene, dichlorobenzene, dichloromethane, trichloronitromethane, methyl bromide, dichloropropane, dibromoethylene, chloroform, dimethyl sulfoxide, acetone, acetonitrile, dimethylformamide, carbon tetrachloride, cyclohexane, cyclohexanone, toluene cyclohexanone, pyridine, phenol, carbon tetrachloride, isooctane, ether, pentane, hexane, propylene oxide, etc.

In some embodiments, the organic solvent that allows a polymer and a fluorescent-encoded material to form a dispersed phase with an organic solvent is one of toluene, chloroform, and dichloromethane.

In the present invention, the polymer and the fluorescent-encoded material are allowed to form a dispersed phase with an organic solvent, so that an emulsion can be formed together with the continuous phase. For example, in some embodiments, the polymer and the fluorescent-encoded material of the present invention form a dispersed phase, to enter a continuous phase and form an oil-in-water emulsion or form small oil-in-water droplets, and then the organic phase is allowed to volatilize in a subsequent step.

SPG Membrane

Figure 7:
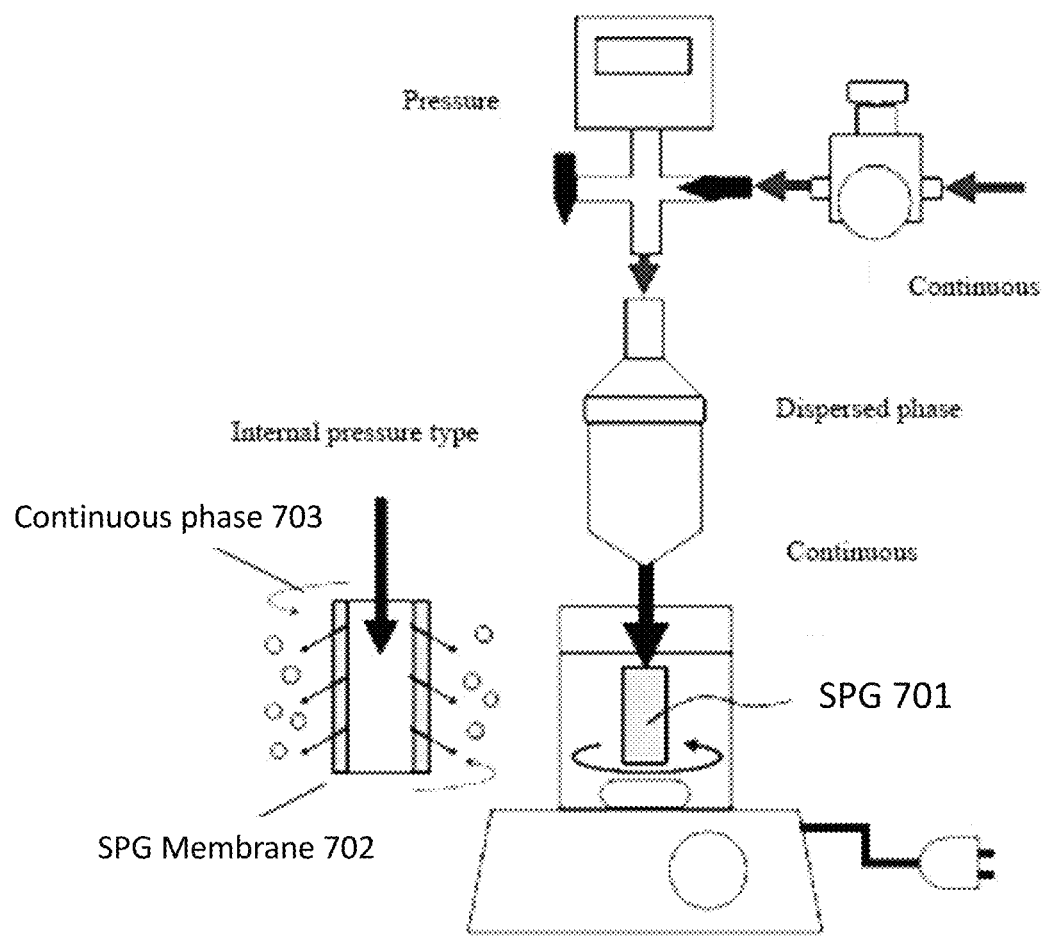
FIG. 7 is a schematic diagram of a SPG membrane emulsifying device used in the present invention (produced by SPG, Japan, and code: MN-20).

SPG membrane (Shirasu Porous Glass membrane) is a kind of porous glass membrane. SPG membrane emulsification method is characterized in that a good emulsion can be obtained by a very small amount of surfactant. SPG membrane specifications: outer diameter 10 mm, inner diameter 8 mm, length 20~500 mm, pore size 0.1-19.6 μm. The pore size determines the size of droplets formed by dispersed phase. Another factor to determine the size of droplets is the pressure. For example, as shown in FIG. 7, the SPG membrane 702 is similar to a hollow cylinder, and the membrane has rigidity. In the hollow membrane, the dispersed phase is subjected to a certain pressure, and under the action of pressure, the dispersed phase passes through the membrane to form droplets on the surface of the membrane. The droplets enter the continuous phase 703, and under the action of the continuous phase 703, wrapped droplets are formed. Of course, the SPG equipment 701 described in FIG. 7 can be used to produce droplets. By this way, the droplets are formed and then slowly stirred to allow the inert organic reagents to volatilize, so that the metal particles cover the continuous phase, to form a metal shell structure that is wrapped on the surface of the core structure formed by the polymer and the fluorescent material.

In some embodiments, the dispersed phase can be located outside the cylindrical SPG membrane (as opposed to the position shown in FIG. 7), and the continuous phase can be located in a hollow cavity. A certain pressure is applied to the dispersed phase outside the SPG membrane, so that the dispersed phase passes through the membrane to form droplets on the surface of the membrane under the action of the pressure, then the droplets enter the continuous phase to form wrapped droplets under the action of the continuous phase. Generally the pressure is applied to an inert gas, which will not have a chemical effect on the dispersed phase. By adjusting appropriate ratio of the dispersed phase and continuous phase and some parameters, uniform particles can be prepared, and the material can be used to detect analytes with high sensitivity.

Pickering Emulsion Method

Pickering emulsion refers to an emulsion obtained by using ultra-fine solid particles as an emulsifier. The ultra-fine solid particles can be used as an oil-in-water or water-in-oil emulsifier. The type of obtained emulsion depends on which phase preferentially wets the solid particles, and usually the phase that preferentially wets the solid particles is the external phase. For example, sometimes solid particles are more easily wetted by the oil phase, and the emulsion is W/O (water-in-oil) type; otherwise, if solid particles are more easily wetted by the water phase, the emulsion is O/W (oil-in-water) type. Solid powders used as emulsifiers include clay, silica, metal hydroxides, graphite, carbon black, etc. The stability of the emulsion is related to the concentration of solid particles, particle size and wettability, etc.

Analyte

The fluorescent-encoded microspheres coated with metal nanoshells prepared by the present invention can be used to detect proteins or nucleic acids. The purpose of these detections is to detect whether liquid samples contain protein or nucleic acid analytes. For example, analytes can be used for the detection of proteins or nucleic acids. For nucleic acid type, virus, bacteria or fungus nucleic acids can be detected, for example, HIV nucleic acid test, hepatitis B virus nucleic acid test, hepatitis C virus nucleic acid test, influenza A virus universal type nucleic acid test, influenza A H1N1 influenza (2009) nucleic acid test, Middle East Respiratory Syndrome (MERS) coronavirus nucleic acid test, adenovirus nucleic acid test, *Legionella pneumophila* (LP) nucleic acid test, respiratory syncytial virus test, *Chlamydia pneumoniae* (CP) nucleic acid test, Dengue virus universal type nucleic acid test, severe fever with thrombocytopenia syndrome Bunia virus nucleic acid test, influenza B virus nucleic acid test, novel coronavirus 2019-nCov nucleic acid test, *Mycobacterium tuberculosis* (TB) nucleic acid test, *Mycoplasma pneumoniae* (MP) nucleic acid test, human papilloma virus nucleic acid detection, *Chlamydia trachomatis* nucleic acid test, etc. Of course, tumor-associated nucleic acids can also be detected.

Protein detections are mainly used for tumor screening, detections of primary hepatocellular carcinoma detection, gonad embryonic cancer (testicular cancer, ovarian cancer, malignant teratoma, etc.), viral hepatitis, cirrhosis, pancreatic cancer, gastric cancer, adenocarcinoma, myeloma, liver functions, hepatolenticular degeneration disease, cardiovascular diseases, blood lipid levels, ovarian serous cystadenocarcinoma, mucinous cystadenocarcinoma, prostate cancer, medullary thyroid cancer, small cell lung cancer, liver fibrosis, liver cirrhosis, heart disease, gastric ulcer, congenital afibrinogenemia, congenital fibrinogen abnormality or dysfunction, sudden placental abruption hemorrhage, pheochromocytoma, medullary thyroid cancer, etc.

Analyte for protein detection may further include carcinoembryonic antigen (CEA), alpha fetoprotein (AEP), carbohydrate antigen 125 (CA125), prostate specific antigen (PSA), calcitonin (CT), chorionic gonadotropin (HCG), albumin, alpha globulin, beta globulin, gamma globulin, immunoglobulin, placental globulin, serum protein, ceruloplasmin, C-reactive protein, total protein, hemoglobin, alanine aminotransferase (ALT), aspartate aminotransferase (AST), total bilirubin, direct/indirect bilirubin, urinary bilirubin, urobilinogen, blood bile acid, glutamyl transpeptidase, alkaline phosphatase, hyaluronic acid, laminin, collagen, pepsin, kidney disease, hematochromatosis, ferritin, calprotectin, troponin, anti-thyroglobulin antibody, fibrinogen, chromogranin, etc.

Fluid Samples

The detection apparatus provided in the invention can be used to detect samples including biological liquid (such as case liquid or clinical samples). The liquid sample or fluid sample can come from solid or semi-solid samples, including excreta, biological tissues and food samples, and these solid or semi-solid samples can be converted to liquid samples by using any suitable methods such as mixing, crushing, macerating, incubating, dissolving or digesting the solid samples in a suitable solution (such as water, phosphate solution or other buffer solutions) with the enzymolysis. "Biological samples" comprise samples from animals, plants and foods, such as urine, saliva, blood and its components, spinal fluids, vaginal secretion, sperms, excrement, sweat, secreta, tissues, organs, tumors, cultures of tissues and organs, cell cultures and media from human or animals. The preferred biological sample is urine; preferably, the biological sample is saliva. Food samples comprise food-processed substances, final products, meat, cheese, liquor, milk and drinking water; and plant samples comprise samples from any plants, plant tissues, plant cell cultures and media. "Environmental samples" come from the environment (such as liquid samples from lake or other water bodies, sewage samples, soil samples, underground water, sea water and effluent samples), and further comprise waste water or other sewage water.

DETAILED DESCRIPTION OF THE EMBODIMENTS

The following describes the preferred embodiments of the present invention with reference to the accompanying drawings, to make the technical content more clear and easy to understand. The present invention may be implemented by different forms of embodiments, and the scope of protection of the invention is not limited to the embodiments described herein.

Example 1

FIG. 1 showed a preferred embodiment of a method for preparing fluorescent-encoded microspheres coated with metal nanoshells provided by the present invention. The fluorescent-encoded microspheres coated with metal nanoshells prepared in this embodiment were CdSe/ZnS QDs/PSMA@Ag nanoshell (wherein precious metal nano-material was Ag nanoparticle, fluorescent-encoded material was CdSe/ZnS quantum dots, and polymer was styrene-maleic anhydride copolymer (PSMA). It included two groups, and the preparation methods were SPG membrane emulsion method and Pickering emulsion method respectively, and the specific preparation procedures were as follows.

The first group(SPG):

0.05 mg of CdSe/ZnS quantum dots (purchased from Suzhou Xingshuo Nanotech Co., Ltd.) and 0.5 g of styrene-maleic anhydride copolymer (PSMA) were dissolved in 8 mL of toluene to form a dispersed phase;

Nanoparticles (particle size of 100 nm) were resuspended in 60 mg of Ag in ethanol (90% ethanol) and dispersed in 100 mL of ultrapure water uniformly under ultrasound conditions, to form a continuous phase;

SPG membranes with the specification of Φ10×L20 mm (effective length 10 mm), with pore size of 5 μm and SPG membrane emulsifying device (purchased from Beijing Jiasheng Xingye Technology Co., Ltd., imported from Japan, model: MN-20) were used. The volume of the continuous phase was 100 ml and the volume of the dispersed phase was 8 ml. Under the nitrogen pressure of 7 KPa, the dispersed phase was squeezed to pass through SPG membrane, and under the action of the shearing force of the continuous phase, uniform and stable oil-in-water droplets were formed on the surface of the SPG membrane.

The Second Group:

0.05 mg of CdSe/ZnS quantum dots and 0.5 g of styrene-maleic anhydride copolymer (PSMA) were dissolved in 8 mL of toluene to form a dispersed phase;

Nanoparticles were resuspended in 60 mg of Ag in ethanol and dispersed in 100 mL of ultrapure water uniformly under ultrasound conditions, to form a continuous phase;

The dispersed phase was slowly added dropwise to the continuous phase under magnetic stirring, and heated and stirred under magnetic force for 20-35 minutes, to make it fully mixed and form a Pickering emulsion.

The obtained two groups of emulsions were magnetically stirred overnight respectively under room temperature, so that the solvent was volatilized and the coded microspheres were solidified. The solidified coded microspheres were washed 3 times with absolute ethanol and ultrapure water, respectively, to obtain fluorescent-encoded microspheres CdSe/ZnS QDs/PSMA@Ag particles coated with metal nanoshells on the surface. The coating, particle size, coefficient of variation and LSPR peak control of the precious metal nanoshells of the two groups of fluorescent-encoded microspheres were shown in the table below.

|  | Coating of precious metal nanoshells | Particle size | Coefficient of variation (CV) | LSPR peak control |
|---|---|---|---|---|
| First group (SPG method) | Even coating | 7 μm | 3.01% | Completely controlled around 428 nm |
| Second group (Pickering emulsion method) | Uneven coverage | 10-100 μm | 67% | Uncontrolled |

As shown above, the fluorescent-encoded microsphere CdSe/ZnS QDs/PSMA@Ag nanoshell prepared by the SPG emulsion method was more uniform and stable, and the LSPR peak was controllable.

At present, the methods of coating precious metal nanoshells on the surface of polymer microspheres mainly include seed growth method, layer-by-layer self-assembly method, in-situ chemical reduction method, solvent swelling co-deposition method, and pickering emulsion polymerization method, etc. This preparation method was the SPG emulsion method. With simple process, high surface coating rate, good uniformity and controllable LSPR peak, this method solves the problems of the existing common coating method of precious metal nanoshells such as low surface coverage, poor uniformity, complex preparation processes and uncontrollable LSPR peaks, etc.

Example 2

The fluorescent-encoded microspheres coated with metal nanoshells (the first group) prepared in this embodiment were $CuInS_2$/ZnS QDs/PSMA@Ag nanoshell, wherein the precious metal nano-material was Ag nanoparticle, and the fluorescent-encoded material was $CuInS_2$/ZnS quantum dots. The polymer was styrene-maleic anhydride copolymer (PSMA). In addition, in another group, no metal nanoshell was used and sodium lauryl sulfate (SDS) was used as a surfactant to prepare a fluorescent-encoded microsphere, and the group was the control group (the second group). The preparation method was SPG-Pickering emulsion method, and the specific preparation steps were as follows.

The First Group:

1 mg of $CuInS_2$/ZnS quantum dots and 0.5 g of styrene-maleic anhydride copolymer (PSMA) were dissolved in 8 mL of toluene to form a dispersed phase;

Nanoparticles (particle size of 80 nm) were resuspended in 75 mg of Ag in ethanol and dispersed in 100 mL of ultrapure water uniformly under ultrasound conditions, to form a continuous phase;

SPG membranes with the specification of Φ10×L20 mm (effective length 10 mm), with pore size of 10 μm and SPG membrane emulsifying device (purchased from Beijing Jiasheng Xingye Technology Co., Ltd., imported from Japan, model: MN-20) were used. The volume of the continuous phase was 125 ml and the volume of the dispersed phase was 10 ml. Under the nitrogen pressure of 3 KPa, the dispersed phase was squeezed to pass through SPG membrane, and under the action of the shearing force of the continuous phase, uniform and stable oil-in-water droplets were formed on the surface of the SPG membrane.

The Second Group:

1 mg of $CuInS_2$/ZnS quantum dots and 0.5 g of styrene-maleic anhydride copolymer (PSMA) were dissolved in 8 mL of toluene to form a dispersed phase;

0.5 g of sodium lauryl sulfate (SDS) was dissolved in 100 mL of ultrapure water, to prepare 0.5 wt % SDS solution, which was used as a continuous phase;

An oil-in-water emulsion was prepared by using a SPG membrane with a pore size of 10 μm under a pressure of 3 KPa and under the action of shearing force of the continuous phase.

SPG membranes with the specification of Φ10×L20 mm (effective length 10 mm), with pore size of 10 μm and SPG membrane emulsifying device (produced by Japan SPG, model: MN-20, schematic diagram as shown in FIG. 7) were used. The volume of the continuous phase was 125 ml and the volume of the dispersed phase was 10 ml. Under the nitrogen pressure of 3 KPa, the dispersed phase was squeezed to pass through SPG membrane, and under the action of the shearing force of the continuous phase, uniform and stable oil-in-water droplets were formed on the surface of the SPG membrane.

The obtained two groups of emulsions were magnetically stirred overnight respectively under room temperature, so that the solvent was volatilized and the coded microspheres were solidified. The solidified coded microspheres were washed 3 times with absolute ethanol and ultrapure water, respectively, to obtain two groups of fluorescent-encoded microspheres.

The particle size, coefficient of variation and LSPR peak control of the two groups of fluorescent-encoded microspheres were detected, and results were shown in the table below.

|  | Particle size | Coefficient of variation (CV) | LSPR peak control |
|---|---|---|---|
| First group (Surface coated with Ag nanoshell) | 12 μm | 3.01% | Completely controlled around 428 nm |
| Second group (without metal nanoshell) | 12-15 μm | 6.97% | Without LSPR effect |

As shown above, the fluorescent-encoded microspheres coated with precious metal nanoshells on the surface $CuInS_2$/ZnS QDs/PSMA@Ag nanoshell were more uniform in particle size and have obvious LSPR effect and the LSPR peak was controllable, therefore, it can effectively improve the detection sensitivity.

Example 3

The fluorescent-encoded microspheres coated with metal nanoshells prepared in this example were HPS/MOTAS@Au nanoshell, wherein the precious metal nano-material was Ag nanoparticle and the fluorescent-encoded material was 1,1,2,3,4,5-hexaphenylsilole (HPS), the polymer was styrene-acrylic acid copolymer (MOTAS). The preparation method was SPG-Pickering emulsion method, and the specific preparation procedures were as follows.

0.8 mg of HPS and 0.5 g of styrene-acrylic acid copolymer (MOTAS) were dissolved in 8 mL of toluene to form a dispersed phase;

Nanoparticles were resuspended in 100 mg of Ag in ethanol and dispersed in 100 mL of ultrapure water uniformly under ultrasound conditions, to form a continuous phase;

SPG membranes with the specification of Φ10×L20 mm (effective length 10 mm), with pore size of 3 μm and SPG membrane emulsifying device (purchased from Beijing Jiasheng Xingye Technology Co., Ltd., imported from Japan, model: MN-20) were used. The volume of the continuous phase was 160 ml and the volume of the dispersed phase was 10 ml. Under the nitrogen pressure of 4 KPa, the dispersed phase was squeezed to pass through SPG membrane, and under the action of the shearing force of the continuous phase, uniform and stable oil-in-water droplets were formed on the surface of the SPG membrane;

The obtained emulsions were magnetically stirred overnight under room temperature, so that the solvent was volatilized and the coded microspheres were solidified. The solidified coded microspheres were washed 3 times with absolute ethanol and ultrapure water, respectively, to obtain fluorescent-encoded microspheres coated with metal nanoshells HPS/MOTAS@Au nanoshell, which were coated with precious metal nanoshells uniformly on the surface, with particle size of 4.5 μm, CV of 2.85%, good uniformity and LSPR peaks controlled around 428 nm.

Example 4

The fluorescent-encoded microspheres coated with metal nanoshells prepared in this embodiment were Mn: ZnSe/ZnS QDs/PSMA@Au nanoshell, wherein the precious metal nano-material was Ag nanoparticle, the fluorescent-encoded material was Mn: ZnSe/ZnS quantum dots, and the polymer was styrene-maleic anhydride copolymer (PSMA). The preparation method was SPG-Pickering emulsion method, and the specific preparation steps were as follows.

0.8 mg of Mn: ZnSe/ZnS quantum dots and 0.5 g of styrene-maleic anhydride copolymer (PSMA) were dissolved in 6 mL of chloroform to form a dispersed phase;

Nanoparticles of 60 mg of Ag resuspended in ethanol were dispersed in 100 mL of ultrapure water, and dispersed uniformly under ultrasound conditions to form a continuous phase;

SPG membranes with the specification of Φ10×L20 mm (effective length 10 mm), with pore size of 3 μm and SPG membrane emulsifying device (produced by Japan SPG, model: MN-20, schematic diagram as shown in FIG. 7) were used. The volume of the continuous phase was 125 ml and the volume of the dispersed phase was 9 ml. Under the nitrogen pressure of 4 KPa, the dispersed phase was squeezed to pass through SPG membrane, and under the action of the shearing force of the continuous phase, uniform and stable oil-in-water droplets were formed on the surface of the SPG membrane;

The obtained emulsions were magnetically stirred overnight under room temperature, so that the solvent was volatilized and the coded microspheres were solidified. The solidified coded microspheres were washed 3 times with absolute ethanol and ultrapure water, respectively, to obtain fluorescent-encoded microspheres coated with metal nanoshells Mn: ZnSe/ZnS QDs/PSMA@ Au nanoshell, which were coated with precious metal nanoshells uniformly on the surface, with particle size of 4.5 μm, CV of 2.84%, good uniformity and LSPR peaks controlled around 428 nm.

The fluorescent-encoded microsphere Mn: ZnSe/ZnS QDs/PSMA@ Au nanoshell was dispersed in ultrapure water, to investigate it stability to temperature, pH, and time.

Figure 4:
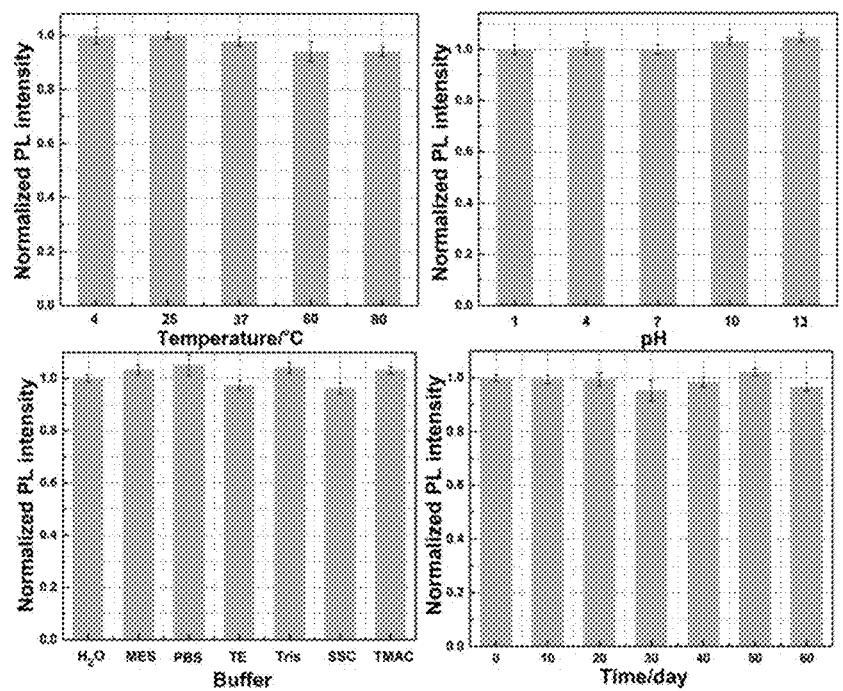
FIG. 4 shows the stability of fluorescent-encoded microspheres coated with metal nanoshells obtained in a preferred embodiment of the present invention for different temperature, pH, buffer, and time (Example 4).

The results were shown in FIG. 4, with the change of temperature from 4° C. to 80° C. (experiments lasted 2 months), the fluorescence intensity of fluorescent-encoded microsphere ZnSe/ZnS QDs/PSMA@ Au nanoshell was always maintained at 0.95~1.0, with very good stability. When the pH value changed from 1 to 13 (the experiment lasted for 1 month)), the fluorescence intensity of fluorescent-encoded microsphere Mn: ZnSe/ZnS QDs/PSMA@ Au nanoshell was always stable and maintained at 0.99~1.01. The fluorescence intensity of fluorescent-encoded microsphere Mn: ZnSe/ZnS QDs/PSMA@Au nanoshell over different storage times (0, 10, 20, 30, 40, 50, 60 days respectively) was investigated respectively, the results were always maintained relatively stable, within the range of 0.96~1.01. The stability of granular material was an important property. If it is unstable for a long time, it will form agglomerates, which cannot be used as a detection material.

In addition, the stability of the fluorescent-encoded microsphere Mn: ZnSe/ZnS QDs/PSMA@Au nanoshell in different buffers (such as H2O, MES, PBS, TE, Tristan, SSC, TMAC) was investigated, and its fluorescence intensity always maintained stable, within the range of 0.95~1.05. This indicated that the microspheres of the present invention can be applied to different buffer solutions, with wider application range.

In this example, the fluorescent-encoded microsphere Mn: ZnSe/ZnS QDs/PSMA@ Au nanoshell was dispersed in different buffers, and its stability over the temperature, pH, and time was investigated respectively. Results showed that its stability always maintained excellent.

Example 5

Figure 5:
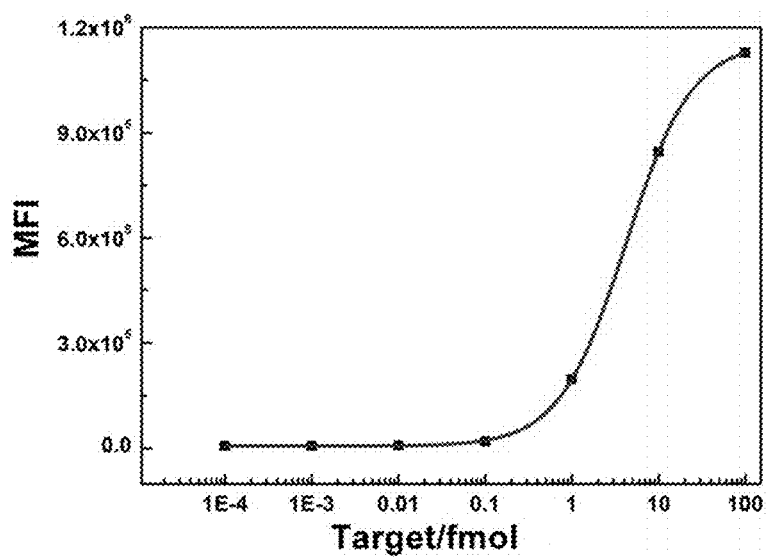
FIG. 5 is a standard curve of fluorescent-encoded microspheres coated with metal nanoshells as a carrier for DNA detection of *Mycoplasma* pneumonia according to a preferred embodiment of the present invention (Example 5).

FIG. 5 was a preferred embodiment of fluorescent-encoded microspheres coated with metal nanoshells provided by the present invention that was used for nucleic acid detection. In this example, for the first group in Example 1, the CdSe/ZnS QDs/PSMA@Ag nanoshell fluorescent-encoded microsphere prepared by SPG emulsion method was used as a carrier and the liquid-phase chip detection technology was used to achieve quantitative detection of *Mycoplasma pneumoniae* DNA. The specific procedures were as follows.

The CdSe/ZnS QDs/PSMA@Ag nanoshellfluorescent-encoded microsphere prepared in Example 1 and thiolated DNA-coated probes were incubated at room temperature with shaking for 2 h, to conjugate DNA-coated probes on the surface of microspheres;

The above CdSe/ZnS QDs/PSMA@Ag nanoshell fluorescent-encoded microsphere conjugated with DNA-coated probes were added to wells of a 96-well plate, and then PCR amplification products and detection probes were added. The denaturation was performed at 95° C. for 5 min, and reaction was performed for 30 min at 45° C., then separation and washing by magnetic plates was carried out, to remove unreacted target DNAs;

Then streptavidin-labeled fluorescent reporter FITC was added and incubated with shaking at room temperature for 10 min, and separated and washed by magnetic plates to remove excess FITC;

Data were read with a flow cytometer to obtain the DNA content.

By using CdSe/ZnS QDs/PSMA@Ag nanoshell fluorescent-encoded microsphere as a carrier and the liquid-phase chip detection technology, the *Mycoplasma pneumoniae* DNA was quantitatively detected. The detection sensitivity was very high and a minimum of 1 μL samples could be detected. The minimum detection amount of DNA was 0.1 fmol, with a sensitivity as high as 99.9%.

Example 6

Figure 6:
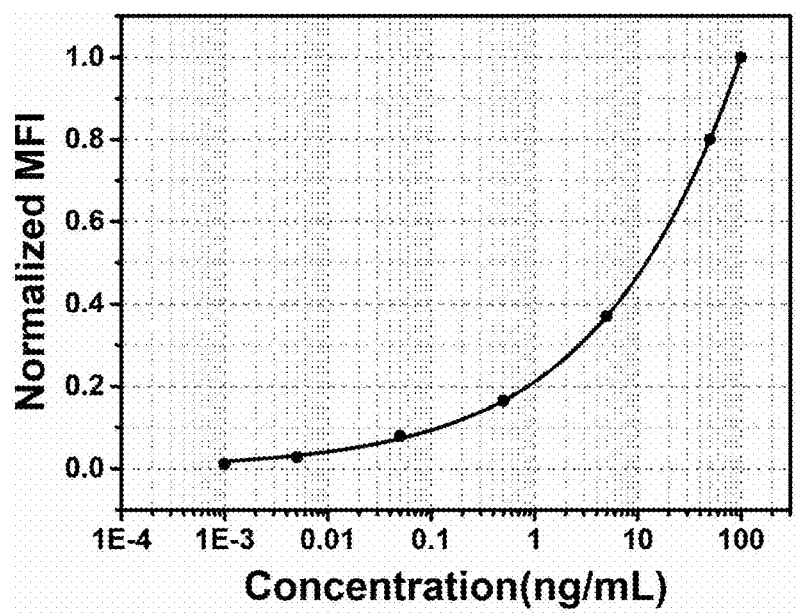
FIG. 6 is a standard curve of fluorescent-encoded microspheres coated with metal nanoshells as a carrier for detection of the tumor marker CEA according to a preferred embodiment of the present invention (Example 6).

FIG. 6 was a preferred embodiment of fluorescent-encoded microsphere coated with metal nanoshells that was used for protein detection. In this example, two groups of fluorescent-encoded microspheres prepared in Example 2 were used as a carrier and the liquid-phase chip detection technology was used to quantitatively detect the tumor marker CEA. The specific procedures were as follows.

The two groups of fluorescent-encoded microspheres prepared in Example 2 were modified with amino-polyethylene glycol-carboxyl groups respectively, then its carboxyl group on the surface was activated by EDC (1-(3-dimethylaminopropyl)-3-ethylcarbodiimide hydrochloride) and NHS (N-hydroxythiosuccinimide sodium salt), and then CEA coated antibody was coated on the surface of encoded microspheres;

The above $CuInS_2$/ZnS QDs/PSMA@Ag nanoshellfluorescent-encoded microsphere coated with CEA coated antibody was added to a 96-well plate, then patient serum was added and incubated for 1 h at room temperature with shaking, then separated and washed by magnetic plates to remove unreacted CEA;

Then biotin-labeled CEA detection antibodies were added to the 96-well plate, incubated for 1 h at room temperature with shaking, then separated and washed by magnetic plates to remove excess CEA detection antibodies;

Streptavidin-labeled fluorescent reporter PE was added and incubated with shaking at room temperature for 10 min, and separated and washed by magnetic plates to remove excess SAPE;

The data were read with a flow cytometer to obtain the CEA content in the patient's serum.

The minimum detection amount of samples, minimum detected amount and detection sensitivity of fluorescent-encoded microspheres when used as a liquid-phase chip in the two groups were compared. Results were shown in the table below.

|  | Minimum detected amount | Detection sensitivity |
| --- | --- | --- |
| First group (SPG method) | 0.001 ng/ml | 99.5% |
| Second group (without metal coating) | 0.033 ng/ml | 90.1% |

As shown from the above, CuInS2/ZnS QDs/PSMA@Ag nanoshell fluorescent-encoded microspheres coated with Ag nanoshell on the surface could quantitatively detect the tumor marker CEA, with high detection sensitivity. Its minimum detected amount of CEA was 0.001 ng/ml and it had strong stability and sensitivity of 99.5%. Its detection effect was significantly superior to the fluorescent-encoded microsphere without metal nanoshell.

The present invention further includes the following technical solutions.

Clause 1. A method for preparing fluorescent-encoded microspheres coated with metal nanoshells, comprising the following steps:
allowing metal particles to form a suspension in an amphiprotic solvent, forming a continuous phase: dissolving a fluorescent material and a polymer in an inert solvent to form a dispersed phase:
providing an SPG membrane having a first side and a second side, wherein the first side being in contact with a dispersed phase, and the second side being in contact with the continuous phase, allowing the dispersed phase to flow into the second side of the SPG membrane through the first side of the SPG membrane and contact with the continuous phase under the action of the pressure, and form oil-in-water droplets in the continuous phase when metal nano-material in the continuous phase acts as a surfactant during the contact process.

Clause 2. The method according to clause 1, wherein the amphiprotic solvent comprises water, methanol or ethanol.

Clause 3. The method according to clause 1, wherein the inert solvent is benzene or chloroform.

Clause 4. The method according to clause 1, wherein the pressure is gas pressure.

Clause 5. The method according to clause 1, wherein the SPG membrane has a pore size, the dispersed phase passes through the SPG membrane to form droplets, the droplets detach from the surface of the SPG membrane and form an oil-in-water emulsion under the action of shearing force of the continuous phase.

Clause 6. The method according to clause 1, wherein the method further comprises: allowing oil-in-water droplets to undergo magnetic stirring at room temperature to evaporate organic solvents, so that precious metal nano-material is uniformly coated on the surface of the polymer microsphere to obtain fluorescent-encoded microspheres coated with metal nanoshells.

Clause 7. The method according to clause 1, wherein the metal nano-material is a precious metal nano-material.

Clause 8. The method according to clause 7, wherein the precious metal nano-material comprises one of gold nanoparticle, gold nanorod, gold nanobipyramid, silver nanosphere, silver nanocube, gold@silver core-shell nanoparticle, silver@gold core-shell nanoparticle and gold/silver alloy nanoparticle.

Clause 9. The method according to clause 2, wherein the amphiprotic solvent in step one is ethanol.

Clause 10. The method according to clause 1, wherein the polymer comprises one or more of styrene-maleic anhydride copolymer, styrene-acrylic acid copolymer, and polystyrene.

Clause 11. The method according to clause 1, wherein the fluorescent-encoded material comprises a quantum dot luminescent material or an aggregation-induced emission material.

Clause 12. The method according to clause 1, wherein the quantum dot luminescent material comprises CdSe/ZnS, CdSe/CdS, CdTeSe/ZnS, CdTe/CdSe/ZnS, CdTe, Ag2S, Ag2Se, InAs, InP, HgTe, PbS, PbSe, CuInS2, CuInSe2, CdSeTe, CdHgTe, InP/ZnS, InAs/CdSe, CdTe/CdS, CdTe/ZnS, CdTe/CdSe, ZnTe/CdTe, ZnTe/CdSe, ZnTe/CdS, CdSeTe/CdS, Cu:CdS/ZnS, Mn:ZnSe/ZnS, CuInS2/ZnS, CuInSe2/ZnS, CsPbCl3, CsPbBr3, CsPbI3, CsPb (Cl/Br)3, CsPb (Br/I)3, CH3NH3PbI3 or CH3NH3PbBr3.

Clause 13. The method according to clause 1, wherein the aggregation-induced emission material comprises one or more of 1,1,2,3,4,5-hexaphenylsilole (HPS), tetraphenylethylene (TPE), 9, 10-diphenylvinylanthracene (DSA), triphenylamine, tetraphenylethylene-perylene diimide, triphenylamine-fumaronitrile compound (BDABFN), tetraphenylethylene-triphenylamine derivative (TPE-TPA-DCM), tetraphenylethylene-sulfonate derivative (BSPOTPE), cyano-substituted diarylethylene derivative and boron-based and silicon-based AIE molecules and derivatives thereof.

Clause 14. The method according to clause 1, wherein the concentration of precious metal nano-material was larger than 0 and smaller than or equal to 0.3 mg/mL in the amphiprotic solvent.

Clause 15. The method according to clause 1, wherein the concentration of the fluorescent-encoded material is larger than 0 and smaller than or equal to 50 mg/mL in the inert solvent.

Clause 16. The method according to clause 1, wherein the concentration of the polymer is larger than 0 and smaller than or equal to 2 g/mL in the oil phase.

Clause 17. The method according to clause 1, wherein the inert solvent is one of toluene, chloroform, dichloromethane.

Clause 15. A fluorescent-encoded microsphere coated with metal nanoshells obtained by the method for preparing fluorescent-encoded microspheres coated with metal nanoshells according to any one of clause 1 to 17, wherein the fluorescent-encoded microspheres comprise metal nanoshells, polymers, fluorescent-encoded materials, the fluorescent-encoded microsphere has a particle size of 1 μm to 20 μm, with a coefficient of variation CV of less than 10%.

Clause 16. The fluorescent-encoded microspheres coated with metal nanoshells according to claim 18, wherein the metal is a precious metal.

The invention shown and described herein may be implemented in the absence of any elements, limitations specifically disclosed herein. The terms and expressions used herein are for illustration rather than limitation, which do not exclude any equivalents of the features and portions described herein in the use of these terms and expressions, in addition, it should be understood that various modifications are feasible within the scope of the present invention. It is therefore to be understood that, although the invention has been particularly disclosed by various embodiments and alternative features, modifications and variations of the concepts described herein may be employed by those of skilled in the art, and such modifications and variations will fall into the scope of protection of the present invention as defined by the appended claims.

The contents of the articles, patents, patent applications, and all other documents and electronic information available or documented herein are incorporated herein by reference in their entirety, as if each individual publication is specifically and individually indicated for reference. The applicant reserves the right to incorporate any and all materials and information from any such article, patent, patent application or other document into this application.

The invention claimed is:

1. A method for preparing fluorescent-encoded microspheres coated with metal nanoshells, comprising the following steps:

allowing metal particles to form a suspension in an amphiprotic solvent as to form a continuous phase;

dissolving a fluorescent material and a polymer in an inert solvent to form a dispersed phase;

providing an SPG membrane having a first side and a second side, wherein the first side being in contact with the dispersed phase, and the second side being in contact with the continuous phase; under a pressure, allowing the dispersed phase to flow from the first side through the SPG membrane to contact with the continuous phase, as to form an oil-in-water droplet in the continuous phase under such condition that metal nano-material in the continuous phase acts as a surfactant during the contact process.

2. The method according to claim 1, wherein the amphiprotic solvent comprises water, methanol or ethanol.

3. The method according to claim 1, wherein the inert solvent is benzene or chloroform.

4. The method according to claim 1, wherein the pressure is a gas pressure.

5. The method according to claim 1, wherein the SPG membrane has a pore size, the dispersed phase passes through the SPG membrane to form droplets, the droplets detach from the surface of the SPG membrane and form an oil-in-water emulsion under the action of shearing force of the continuous phase.

6. The method according to claim 1, wherein the method further comprises: allowing the oil-in-water droplets to undergo magnetic stirring at room temperature to evaporate the inert solvent from the oil including a polymer microsphere with the fluorescent material, so that precious metal nano-material is uniformly coated on the surface of the polymer microsphere to obtain fluorescent-encoded microspheres coated with metal nanoshells.

7. The method according to claim 1, wherein the metal nano-material is a precious metal nano-material.

8. The method according to claim 7, wherein the precious metal nano-material comprises one of gold nanoparticle, gold nanorod, gold nanobipyramid, silver nanosphere, silver nanocube, gold@silver core-shell nanoparticle, silver@gold core-shell nanoparticle, gold or silver alloy nanoparticle.

9. The method according to claim 2, wherein the amphiprotic solvent is ethanol.

10. The method according to claim 1, wherein the polymer comprises one or more of styrene-maleic anhydride copolymer, styrene-acrylic acid copolymer, and polystyrene.

11. The method according to claim 1, wherein the concentration of the precious metal nano-material is larger than 0 and smaller than or equal to 0.3 mg/mL in the amphiprotic solvent.

12. The method according to claim 1, wherein the concentration of the fluorescent material is larger than 0 and smaller than or equal to 50 mg/mL in the inert solvent.

13. The method according to claim 12, wherein the concentration of the polymer is larger than 0 and smaller than or equal to 2 g/mL in the oil phase.

14. The method according to claim 1, wherein the inert solvent is toluene, chloroform, or dichloromethane.

15. The method according to claim 1, wherein the pressure is a pressure under nitrogen.

16. A fluorescent-encoded microsphere coated with metal nanoshells obtained by the method for preparing fluorescent-encoded microspheres coated with metal nanoshells according to claim 1, wherein the fluorescent-encoded microspheres comprise metal nanoshells, polymers, fluorescent-encoded materials, the fluorescent-encoded microsphere has a particle size of 1 μm to 20 μm, with a coefficient of variation CV of less than 10%.

17. The fluorescent-encoded microspheres coated with metal nanoshells according to claim 16, wherein the metal is a precious metal.

* * * * *